(12) United States Patent
Alarcon et al.

(10) Patent No.: US 12,712,814 B2
(45) Date of Patent: Aug. 18, 2026

(54) METHOD AND DEVICE FOR MANAGING MESSAGES BROADCAST IN A LOCAL AREA NETWORK

(71) Applicant: SAGEMCOM BROADBAND SAS, Bois-Colombes (FR)

(72) Inventors: Laurent Alarcon, Bois-Colombes (FR); Sylvain Le Roux, Bois-Colombes (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 0 days.

(21) Appl. No.: 18/384,636

(22) Filed: Oct. 27, 2023

(65) Prior Publication Data

US 2024/0146660 A1 May 2, 2024

(30) Foreign Application Priority Data

Nov. 2, 2022 (FR) ...................................... 2211405

(51) Int. Cl.
*H04L 47/24* (2022.01)
*H04L 41/12* (2022.01)
*H04L 47/32* (2022.01)

(52) U.S. Cl.
CPC .............. *H04L 47/24* (2013.01); *H04L 41/12* (2013.01); *H04L 47/32* (2013.01)

(58) Field of Classification Search
CPC ......... H04L 47/24; H04L 41/12; H04L 47/32; H04L 12/66; H04W 40/04; H04W 40/22;
(Continued)

(56) References Cited

U.S. PATENT DOCUMENTS

2012/0278845 A1* 11/2012 Ou ........................ H04L 1/1887 725/93
2013/0201979 A1* 8/2013 Iyer ..................... H04L 12/4679 370/338

(Continued)

FOREIGN PATENT DOCUMENTS

EP 3787344 B1 10/2021
WO 2021161225 A1 8/2021

OTHER PUBLICATIONS

Apr. 20, 2023 Search Report issued in French Patent Application No. 2211405.

*Primary Examiner* — Michael A Keller
*Assistant Examiner* — Thao D Duong
(74) *Attorney, Agent, or Firm* — Williams Mullen; R. Brian Drozd

(57) ABSTRACT

Methods/devices for managing messages broadcast in a local area network (LAN) include nodes allowing an extension of wireless communication coverage and stations. The nodes are connected together by a backhaul subnetwork, and at least one node sends at least one wireless network to which the stations are connected. The LAN includes a primary subnetwork and a secondary subnetwork. The primary subnetwork is a subnetwork to which the links of the backhaul network and the nodes belong. The secondary subnetwork is composed of at least one station and is isolated from the rest of the LAN by a virtual network. A node able to apply the filtering rules demands an analysis of the topology of the local network, determines, from the topology of the LAN, filtering rules to be applied, and applies the filtering rules determined to the broadcast packets including at least one item of information identifying the virtual network.

7 Claims, 7 Drawing Sheets

(58) Field of Classification Search
CPC ... H04W 40/246; H04W 84/12; H04W 88/04; H04W 88/16
See application file for complete search history.

(56) References Cited

U.S. PATENT DOCUMENTS

| | | | | |
|---|---|---|---|---|
| 2013/0301553 | A1* | 11/2013 | Klein | H04W 76/12 370/329 |
| 2016/0094400 | A1* | 3/2016 | Liang | H04L 49/70 370/254 |
| 2018/0013662 | A1* | 1/2018 | Salam | H04L 41/0226 |
| 2020/0092729 | A1* | 3/2020 | Boucadair | H04W 48/04 |
| 2021/0006470 | A1* | 1/2021 | Hotta | H04L 41/12 |
| 2021/0068032 | A1* | 3/2021 | Colliaux | H04W 40/22 |
| 2021/0119815 | A1* | 4/2021 | Liu | H04L 12/66 |
| 2024/0077852 | A1* | 3/2024 | Jasper | G05B 19/41835 |

* cited by examiner 201 202 203

PROC RAM ROM

200

STCK COM 204 205

| Interface | Subnetwork |
|---|---|
| ETH0 | Primary |
| ETH1 | Primary |
| ETH4 | Primary |
| WL0 | Primary |
| WL0.1 | Secondary 1 |
| BRLANG | Primary |
| BR_GUESTG | Secondary 1 |

Fig. 4

| Equipement |
|---|
| BRLLAN1 |
| BR_GUEST1 |
| BRLAN2 |
| BR_GUEST2 |
| PC1 |
| PC2 |
| PC3 |
| PC4 |
| PC5 |
| PC6 |

Fig. 5

| Equipement | Type of equipment |
|---|---|
| BRLAN1 | Compatible AP |
| BR_GUEST1 | Compatible AP |
| BRLAN2 | Incompatible AP |
| BR_GUEST2 | Incompatible AP |
| PC1 | Station |
| PC2 | Station |
| PC3 | Station |
| PC4 | Station |
| PC5 | Station |
| PC6 | Station |

Fig. 6

| Equipement | Type of equipment | Interface |
|---|---|---|
| BRLAN1 | Compatible AP | ETH0 |
| BR_GUEST1 | Compatible AP | ETH0 |
| BRLAN2 | Incompatible AP | ETH1 |
| BR_GUEST2 | Incompatible AP | ETH1 |
| PC1 | Station | ETH0 |
| PC2 | Station | ETH0 |
| PC3 | Station | ETH4 |
| PC4 | Station | ETH0 |
| PC5 | Station | ETH1 |
| PC6 | Station | WL0.1 |

Fig. 7

| Interface | Subnetwork | Interface type |
|---|---|---|
| ETH0 | Primary | BH |
| ETH1 | Primary | BH |
| ETH4 | Primary | FH |
| WL0 | Primary | FH |
| WL0.1 | Secondary 1 | FH |

Fig. 8

| Equipement | Type of equipment | Interface | Direct |
|---|---|---|---|
| BRLAN1 | Compatible AP | ETH0 | |
| BR_GUEST1 | Compatible AP | ETH0 | |
| BRLAN2 | Incompatible AP | ETH1 | |
| BR_GUEST2 | Incompatible AP | ETH1 | |
| PC1 | Station | ETH0 | |
| PC2 | Station | ETH0 | |
| PC3 | Station | ETH4 | X |
| PC4 | Station | ETH0 | |
| PC5 | Station | ETH1 | |
| PC6 | Station | WL0.1 | X |

Fig. 9

| Station | Access point of direct connection |
|---|---|
| PC1 | |
| PC2 | EXT1 |
| PC3 | GW |
| PC4 | EXT1 |
| PC5 | EXT2 |
| PC6 | GW |

Fig. 10

| Equipement | Equipment type | Interface | Direct | Subnetwork |
|---|---|---|---|---|
| BRLAN1 | Compatible AP | ETH0 | | Primary |
| BR_GUEST1 | Compatible AP | ETH0 | | Secondary 1 |
| BRLAN2 | Incompatible AP | ETH1 | | Primary |
| BR_GUEST2 | Incompatible AP | ETH1 | | Secondary 1 |
| PC1 | Station | ETH0 | | Primary |
| PC2 | Station | ETH0 | | Primary |
| PC3 | Station | ETH4 | X | Primary |
| PC4 | Station | ETH0 | | Secondary 1 |
| PC5 | Station | ETH1 | | Secondary 1 |
| PC6 | Station | WL0.1 | X | Secondary 1 |

Fig. 11

METHOD AND DEVICE FOR MANAGING MESSAGES BROADCAST IN A LOCAL AREA NETWORK

TECHNICAL FIELD

The present invention relates to a method and a device for managing messages broadcast in a local area network comprising a subnetwork referred to as primary subnetwork and one or more subnetworks referred to as secondary subnetworks, the local area network comprising nodes allowing an extension of wireless communication coverage.

PRIOR ART

In local area networks (LAN), systems for extending wireless communication coverage can be used in order to increase the range of these local area networks LAN by coordinating a plurality of distributed access points AP. These various access points AP are incorporated in communication nodes, hereinafter simply referred to as nodes, interconnected by means of a backhaul subnetwork and all making available one and the same wireless local area network WLAN.

The nodes of the backhaul subnetwork are connected to one another by means of a mesh structure in tree form, a node then being able to serve as relay between two other nodes of the backhaul subnetwork. The nodes of the backhaul subnetwork are thus interconnected by means of wired connections, for example of the Ethernet type, or wireless connections. The nodes of the backhaul subnetwork are connected together by a network that is also called a backhaul network, which may be either wired or wireless, or a combination of the two.

Each node of the backhaul subnetwork optionally sends at least one wireless network that is called fronthaul network, to which the stations of the user are connected. This fronthaul network, if it uses Wi-Fi/IEEE 802.11 technology, is equivalent to what is called BSS (Basic Service Set).

At least one of the nodes of the backhaul subnetwork is connected to a residential gateway that provides access to the internet. The residential gateway may also form part of the backhaul subnetwork.

Currently, when a station, also called a client, is connected by a wired network such as Ethernet, the station may receive data that are not intended for it.

In addition to security risks (disclosure of information), this situation may also give rise to operating problems. This is because some equipment does not correctly implement filtering when messages are received and treat equivalently messages from the primary subnetwork and those coming from a secondary subnetwork.

Such equipment may therefore for example receive indifferently configurations of the Ipv6 type intended respectively for each of the two subnetworks. These various configurations may, for a client, cause a loss of access to the primary subnetwork, the client adopting the configuration corresponding to the secondary subnetwork.

DISCLOSURE OF THE INVENTION

The invention proposed makes it possible to guarantee that only the legitimate destinations receive a message, for example a broadcast message, in accordance with the criterion of the VLANs applied to these messages.

For this purpose, according to a first aspect, one embodiment proposes a method for managing messages broadcast in a local area network comprising nodes allowing an extension of wireless communication coverage and stations, the nodes allowing an extension of coverage being connected together by a backhaul subnetwork, at least one node allowing an extension of wireless communication coverage sending at least one wireless network, referred to as fronthaul network, to which the stations are connected, the local area network comprising a primary subnetwork and a secondary subnetwork, the primary subnetwork being a subnetwork to which the links of the backhaul network and the nodes belong, the secondary subnetwork being a subnetwork composed of at least one station and which is isolated from the rest of the local area network by a virtual network, characterised in that the method comprises the steps, performed by a node able to apply filtering rules, of:

- demanding an analysis of the topology of the local area network,
- determining, from the topology of the local area network, filtering rules to be applied,
- applying the filtering rules determined to the broadcast packets comprising at least one item of information identifying the virtual network.

The invention also relates to a device for managing messages broadcast in a local area network comprising nodes allowing an extension of wireless communication coverage and stations, the nodes allowing an extension of coverage being connected together by a backhaul subnetwork, at least one node allowing an extension of wireless communication coverage sending at least one wireless network, referred to as fronthaul network, to which the stations are connected, the local area network comprising a primary subnetwork and a secondary subnetwork, the primary subnetwork being a subnetwork to which the links of the backhaul network and the nodes belong, the secondary subnetwork being a subnetwork composed of at least one station and which is isolated from the rest of the local area network by a virtual network, characterised in that the device is included in a node able to apply filtering rules and comprises:

- means for demanding an analysis of the topology of the local area network,
- means for determining, from the topology of the local area network, filtering rules to be applied,
- means for applying the filtering rules determined to the broadcast packets comprising at least one item of information identifying the virtual network.

Thus the present invention makes it possible to guarantee that only the legitimate destinations receive a broadcast message.

According to a particular embodiment, analysing the topology of the network comprises determining the presence of a node unable to apply the filtering rules and/or the presence of a switch connected to the backhaul subnetwork.

According to a particular embodiment, applying the filtering rules to be applied is broken down into substeps of:

- deleting broadcast packets comprising an identifier of a secondary subnetwork on the primary network interfaces of the fronthaul network,
- deleting broadcast packets comprising information identifying a secondary subnetwork on the interfaces of the backhaul subnetwork connected to a switch and/or to an incompatible node,
- transforming the broadcast packets intended for equipment of a secondary subnetwork for which the path from the sender passes through a switch or an incompatible node into unicast packets.

According to a particular embodiment, if the local area network comprises only nodes able to apply the filtering rules and no switch, each compatible node deletes the broadcast packets possessing information identifying a secondary subnetwork on the primary interfaces of the backhaul subnetwork.

According to a particular embodiment, applying the filtering rules to be applied is broken down into a substep of:

- transforming the broadcast messages sent in the secondary subnetworks into unicast messages at each compatible node.

According to a particular embodiment, determining the topology of the network is broken down into substeps of:

- generating a table representing the subnetwork to which each interface and each bridge of a node belongs,
- generating a table representing the list of equipment in the local area network,
- generating a table representing the type of each item of equipment in the local area network,
- generating a table for determining the connection interface of each item of equipment in the local area network,
- generating a table describing, for each interface, whether it belongs to the backhaul subnetwork or to the fronthaul subnetwork,
- generating a table describing, for each item of equipment, whether it is physically connected to an interface of the fronthaul network,
- generating a table describing, for each station, whether it is physically connected to an interface of a node.

According to a particular embodiment, the method is implemented by a node called a residential gateway that provides access to the internet.

A particular embodiment also relates to a computer program product. It comprises instructions for implementing, by an item of equipment, the method according to one of the above embodiments, when said program is executed by a processor of the equipment.

A particular embodiment also relates to a storage medium. It stores a computer program comprising instructions for implementing, by a node device, the method according to one of the above embodiments, when said program is executed by a processor of the node device.

BRIEF DESCRIPTION OF THE DRAWINGS

The features of the invention mentioned above, as well as others, will emerge more clearly from the reading of the following description of an example embodiment, said description being made in relation to the accompanying drawings, among which:

FIG. 4 illustrates an example of a table representing the subnetwork to which each interface and each bridge of a node belongs;

FIG. 5 illustrates an example of a table representing the list of equipment in the local area network;

FIG. 6 illustrates an example of a table representing the type of each item of equipment in the local area network;

FIG. 7 illustrates an example of a table for determining the connection interface of each item of equipment in the local area network;

FIG. 8 illustrates an example of a table describing, for each interface, whether it belongs to the backhaul subnetwork or to the fronthaul subnetwork;

FIG. 9 illustrates an example of a table describing, for each item of equipment, whether it is physically connected to an interface of the fronthaul network, FIG. 10 illustrates an example of a table describing, for each station, whether it is physically connected to an interface of a node;

FIG. 11 illustrates an example of a table describing the topology of the local area network;

DETAILED DISCLOSURE OF EMBODIMENTS

Figures 1, 2:
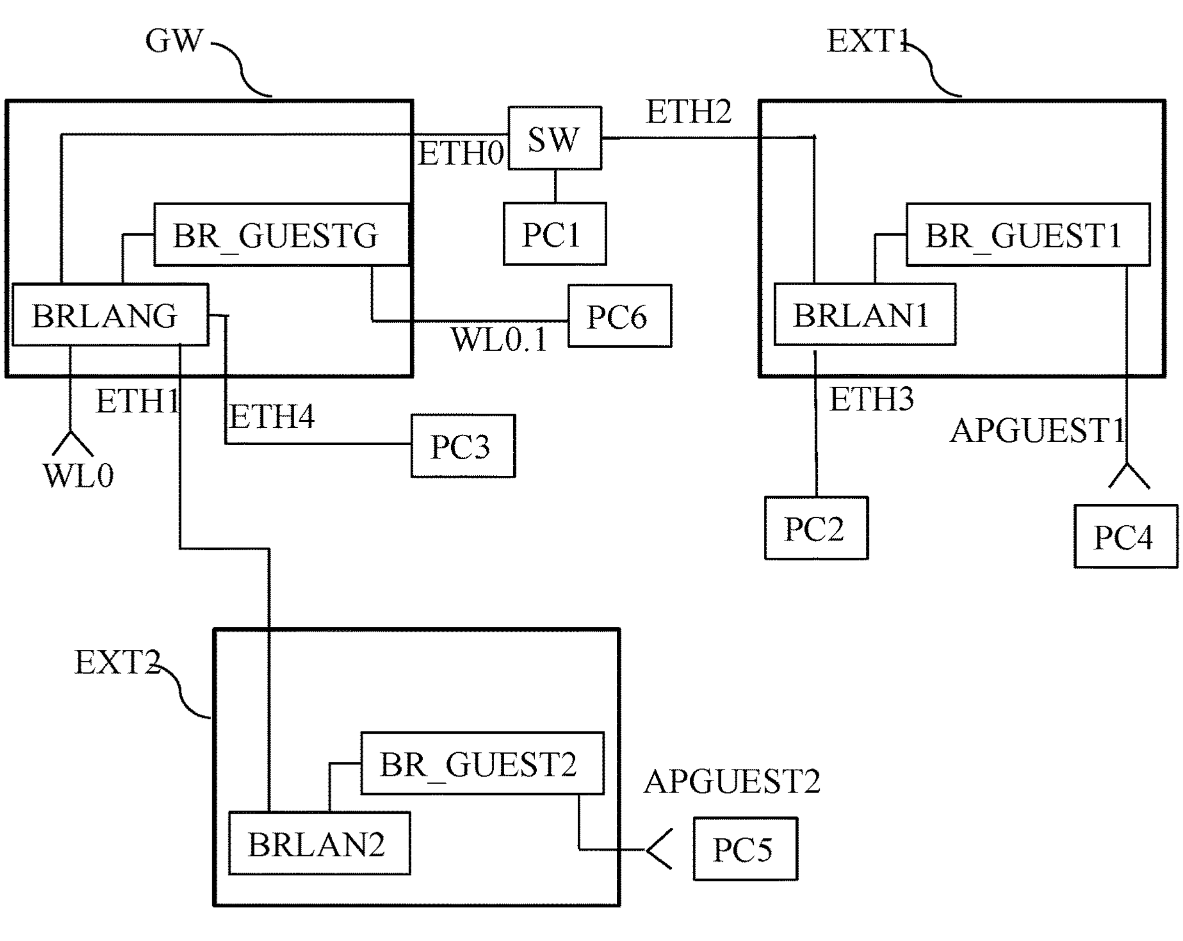
FIG. 1 illustrates schematically an example of a local area network in one embodiment.
FIG. 2 illustrates schematically the architecture of a node according to one embodiment.

FIG. 1 illustrates an example of a local area network in one embodiment.

The local area network comprises three nodes GW, EXT1 and EXT2. The node GW is for example a residential gateway GW that provides access to a wide area network, such as for example the internet.

The nodes EXT1 and EXT2 are for example systems for extending wireless communication coverage that are used in order to increase the range of the local area network by coordinating a plurality of distributed access points AP. These various access points AP are incorporated in the nodes that are interconnected by means of a backhaul subnetwork and all make available one and the same wireless local area network WLAN.

The node EXT1 is for example a compatible node according to embodiments and the node EXT2 is for example an incompatible node A compatible node is a node able to, or adapted to, implement the filtering rules defined according to embodiments. An incompatible node is a node that is unable, or which is not adapted, to implement the filtering rules defined according to embodiments.

Hereinafter the term "node" should be understood to mean equipment offering connectivity capabilities and constituting the mesh local area network.

The local area network comprises a plurality of stations PC1, PC2, PC3, PC4, PC5 and PC6.

Hereinafter the term "station" should be understood to mean fixed or mobile equipment using the resources of the mesh local area network via nodes of said local area network. A station is for example a wireless mobile terminal, a wireless speaker or a personal computer.

The node GW comprises a bridge BRLANG belonging to the primary subnetwork and a bridge BR_GUESTG belonging to the secondary subnetwork.

The primary subnetwork is a subnetwork to which the links of the backhaul network and the access points belong, it is unique in the local area network.

The secondary subnetwork is a subnetwork composed of one or more items of client equipment and is isolated from the rest of the local area network by a virtual network (VLAN). A local area network can contain no, one or more secondary subnetworks.

The bridges BRLANG and BR_GUESTG are interconnected, which allows an exchange of data streams between them.

The interfaces ETH0, ETH1, ETH4 and WL0 are connected to the bridge BRLANG and are interfaces of the primary type. In this non-limitative example, the prefix ETH designates an interface for communication via a wired network of the Ethernet type, and the prefix WL designates an interface for communication via a wireless network.

The interface WL0.1 is connected to the bridge BR_GUESTG and is an interface of the secondary type.

The station PC3 is connected to the bridge BRLANG by means of the interface ETH4.

The station PC6 is connected to the bridge BR_GUESTG by means of the interface WL0.1.

The node EXT1 comprises a bridge BRLAN1 belonging to the primary subnetwork and a bridge BR_GUESTG1 belonging to the secondary subnetwork.

The node EXT1 is a compatible node.

The bridges BRLAN1 and BR_GUEST1 are interconnected in order to be able to exchange data.

The interfaces ETH2 and ETH3 are connected to the bridge BRLAN1 and are interfaces of the primary type.

The interface APGUEST1 is connected to the bridge BR_GUEST1 and is an interface of the secondary type.

The station PC2 is connected to the bridge BRLAN1 by means of the interface ETH3.

The station PC4 is connected to the bridge BR_GUEST1 by means of the interface APGUEST1.

A switch SW is connected to the interfaces ETH0 and ETH2 and a station PC1 is connected to the switch SW. In one example, this switch SW is a packet switch.

The node EXT2 comprises a bridge BRLAN2 belonging to the primary subnetwork and a bridge BR_GUESTG2 belonging to the secondary subnetwork.

The node EXT2 is an incompatible node.

The bridges BRLAN2 and BR_GUEST2 are connected to the interface ETH1.

The station PC5 is connected to the bridge BR_GUEST2 by means of the interface APGUEST2.

FIG. 2 illustrates schematically the architecture of a node according to one embodiment. According to the example of hardware architecture shown in FIG. 2, one or more of the nodes GW, EXT1 and EXT2 comprise, connected by a communication bus 200: a processor or CPU ("central processing unit") 201; a random access memory (RAM) 202; a read only memory (ROM) 203; a storage unit such as a hard disk (or a storage medium reader, such as an SD (Secure Digital) card reader 204); at least one communication interface 205 enabling the node to communicate with the equipment of the local area network.

The processor 201 is capable of executing instructions loaded in the RAM 202 from the ROM 203, from an external memory (not shown), from a storage medium (such as an SD card), or from a communication network. When the node is powered up, the processor 201 is capable of reading instructions from the RAM 202 and executing them. These instructions form a computer program causing the implementation, by the processor 201, of all or part of the method described in relation to FIG. 3.

The method described below in relation to FIG. 3 can be implemented in software form by executing a set of instructions by a programmable machine, for example a DSP ("digital signal processor"), or a microcontroller, or be implemented in hardware form by a machine or a dedicated component, for example an FPGA (field-programmable gate array) or an ASIC (application-specific integrated circuit). In general, the node comprises electronic circuitry configured for implementing the methods described in relation to FIG. 3.

Figures 3A, 3B:
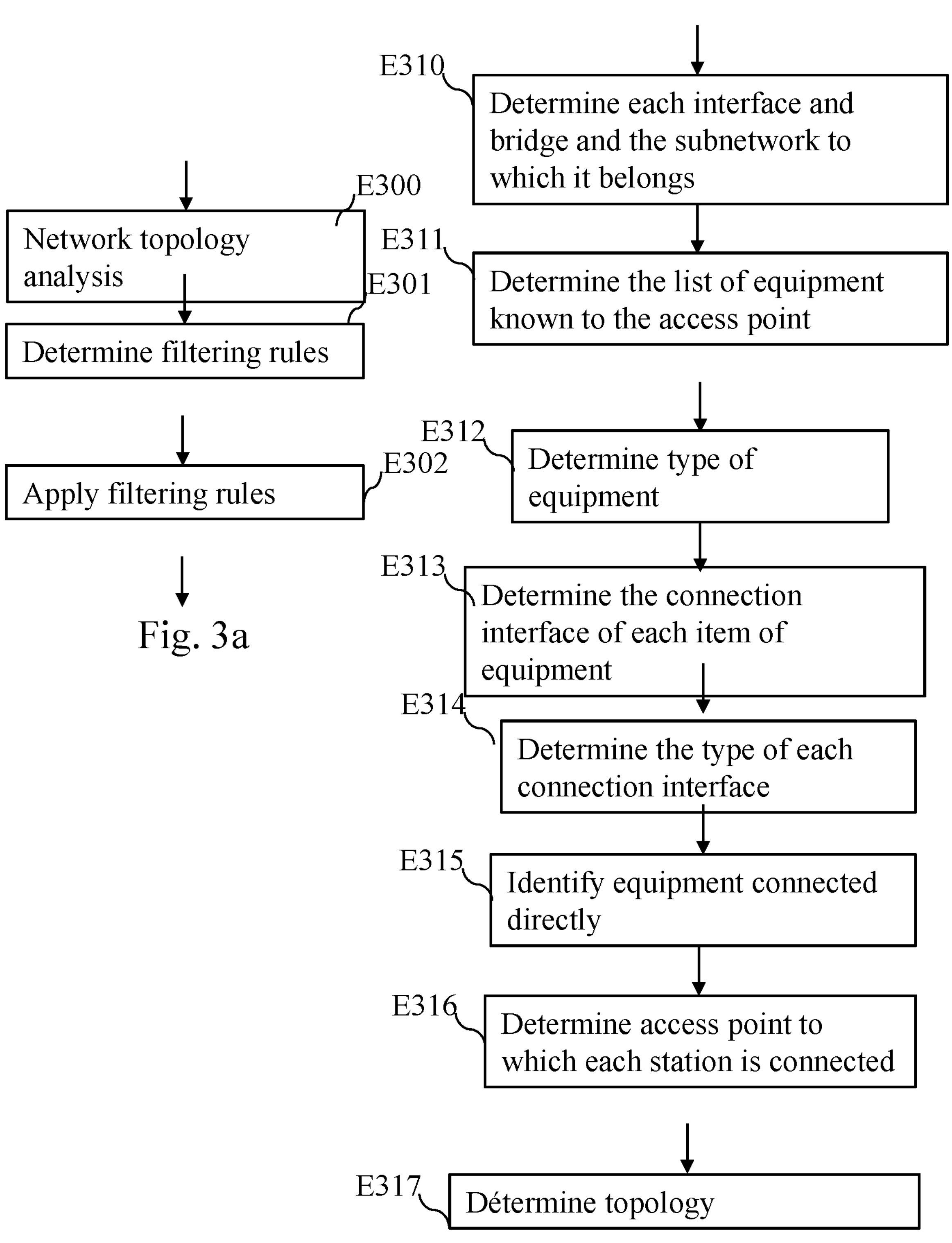
FIG. 3*a* illustrates an example of a method implemented according to one embodiment.
FIG. 3*b* illustrates an example of a method for determining a topology of the local area network according to one embodiment.

FIG. 3*a* illustrates an example of a method implemented according to one embodiment.

At the step E300, a node, for example the node GW, demands an analysis of the topology of the local area network and determines whether at least one node in the local area network is incompatible or whether a switch is present in the local area network. In an embodiment wherein the EasyMesh standard is used, the items of compatible equipment add, in a message, for example of the "Auto-Configuration Search" type, information of the "TLV vendor-specific" type, the presence of which indicates the compatibility of said equipment with the method described here. The absence of this information in a message thus characterises the equipment that sent it as being non-compatible.

At the step E301, the node GW determines, from the topology of the local area network, filtering rules to be applied, At the step E302, the node GW demands the application of the filtering rules determined.

FIG. 3*b* illustrates an example of a method for determining a topology of the local area network according to one embodiment.

At the step E310, the node GW determines the various bridges available to it, the interfaces that are connected thereto and the type of subnetwork to which they belong.

According to the example in FIG. 4, the node GW comprises two bridges BRLANG and BR_GUESTG and five network interfaces ETH0, ETH1, ETH4, WL0 and WL0.1.

The bridge BRLANG belongs to the primary subnetwork and the bridge BR_GUESTG belongs to the secondary subnetwork.

The interfaces ETH0, ETH1, ETH4 and WL0 are interfaces of the primary type.

The interface WL0.1 is an interface of the secondary type.

At the step E311, the node GW obtains the list of all the equipment known to the nodes GW, EXT1 and EXT2.

According to the example in FIG. 5, the equipment is as follows: the bridges BRLAN1 and BR_GUEST1 of the node EXT1, the bridges BRLAN2 and BR_GUEST2 of the node EXT2, and the stations PC1 to PC6.

The list is for example obtained from the ARP ("Address Resolution Protocol") table. At the step E312, the node GW obtains a list that, for all the equipment, identifies the equipment, compatible or not, as well as the stations.

According to the example in FIG. 6, the bridges BRLAN1 and BR_GUEST1 of the node EXT1 comprise compatible access-point interfaces AP, the bridges BRLAN2 and BR_GUEST2 of the node EXT2 comprise access-point interfaces AP that are not compatible and the stations are PC1 to PC6.

At the step E313, the node GW completes the list that, for all the equipment, identifies the equipment, compatible or not, as well as the stations, while identifying the network interfaces of the node GW making it possible to communicate with the equipment.

According to the example in FIG. 7, the bridges BRLAN1 and BR_GUEST1 of the node EXT1 are compatible and the interface ETH0 of the node GW makes it possible to communicate with them. The bridges BRLAN2 and BR_GUEST2 are incompatible and the interface ETH1 of the node GW makes it possible to communicate with them. The interface ETH0 of the node GW makes it possible to communicate with the stations PC1, PC2 and PC4.

The interface ETH4 of the node GW makes it possible to communicate with the station PC3, the interface ETH1 of the node GW makes it possible to communicate with the station PC5 and the interface WL0.1 of the node GW makes it possible to communicate with the station PC6.

At the step E314, the node GW determines a table describing, for each of its network interfaces, whether they belong to the backhaul subnetwork or to the fronthaul subnetwork.

According to the example in FIG. 8, the network interfaces ETH0, ETH1 are primary interfaces belonging to the backhaul network BH, the network interface ETH4 is an interface of the primary subnetwork belonging to the fronthaul network FH, the network interface WL0 is an interface of the primary subnetwork belonging to the fronthaul network and the network interface WL0.1 is an interface of the second network belonging to the fronthaul network.

At the step E315, the node GW determines a table describing, for each item of equipment, whether it is physically connected to an interface of the fronthaul network of the node GW.

Thus, according to the example in FIG. 9, the stations PC3 and PC6 are connected physically or directly, as illustrated by the "Direct" column in FIG. 9, to a fronthaul network of the node GW respectively by the network interfaces ETH4 and WL0.1.

At the step E316, the node GW determines a table describing, for each station, whether it is physically connected to an interface of a node.

Thus, according to the example in FIG. 10, the station PC1 is not physically connected to a network interface of a node.

The station PC2 is physically connected to a network interface of the node GW, the station PC3 is physically connected to a network interface of the node GW, the station PC4 is physically connected to a network interface of the node EXT1, the station PC5 is physically connected to a network interface of the node EXT2 and the station PC6 is physically connected to a network interface of the node GW.

At the step E317, the node GW determines the topology of the local area network.

According to the example in FIG. 11, the bridge BRLAN1 is a bridge of a compatible node communicating with the node GW on the network interface ETH0 and forms part of the primary subnetwork. The bridge BR_GUEST1 is a bridge of a compatible node communicating with the node GW on the network interface ETH0 and forms part of the secondary subnetwork. The bridge BRLAN2 is a bridge of an incompatible node communicating with the node GW on the network interface ETH1 and forms part of the primary subnetwork. The bridge BR_GUEST2 is a bridge of an incompatible node communicating with the node GW on the network interface ETH1 and forms part of the primary subnetwork. The station PC1 communicates with the node GW on the network interface ETH0 and forms part of the primary subnetwork. The station PC2 communicates with the node GW on the network interface ETH0 and forms part of the primary subnetwork. The station PC3 communicates with the node GW on the network interface ETH4, forms part of the primary subnetwork and is directly connected to the node GW. The station PC4 communicates with the node GW on the network interface ETH0 and forms part of the secondary subnetwork. The station PC5 communicates with the node GW on the network interface ETH1 and forms part of the secondary subnetwork. The station PC6 communicates with the node GW on the network interface WL0.1, forms part of the secondary subnetwork and is physically or directly connected to the node GW.

In the example in FIG. 3*b*, the node GW performs the steps E310 to E317.

In a variant, some of the steps E310 to E317 are optional. For example, some of the steps may have been performed during a previous implementation of the method for determining a topology of the local area network according to one embodiment, and the result of these respective steps may have been saved by the node GW.

Figure 12:
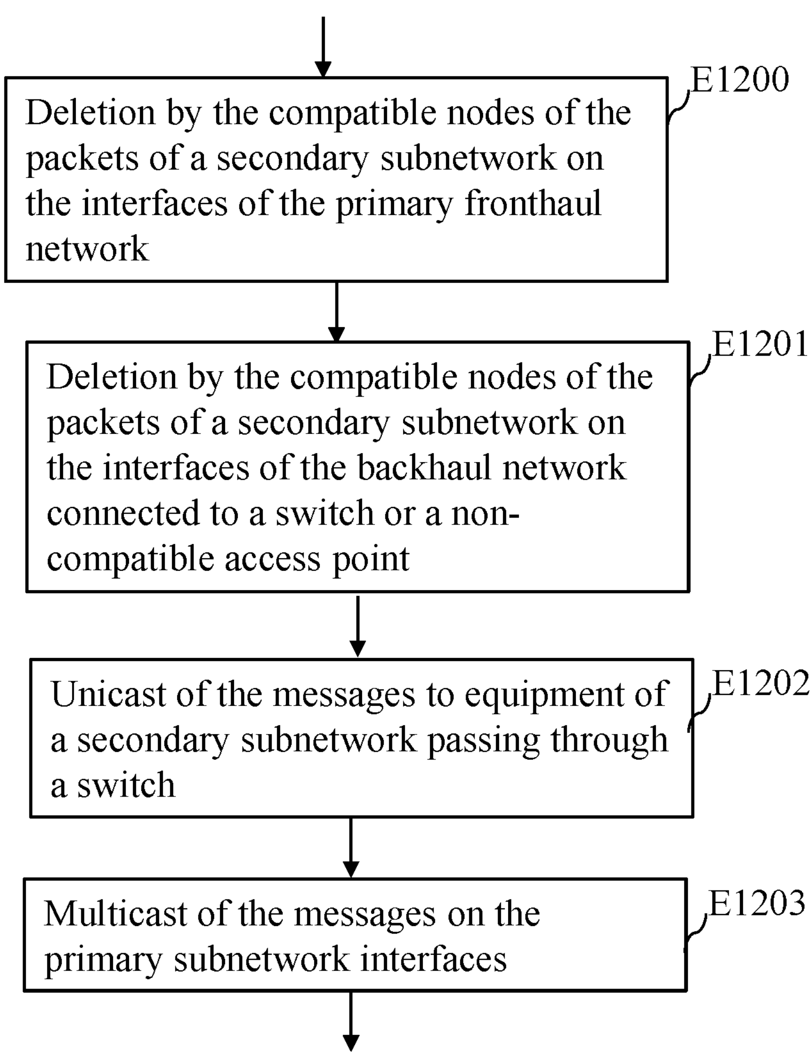
FIG. 12 illustrates an example of an algorithm applying filtering rules according to one embodiment.

FIG. 12 illustrates an example of an algorithm applying filtering rules according to one embodiment.

At the step E1200, each compatible node deletes the broadcast packets comprising information identifying a secondary subnetwork on the interfaces of the primary subnetwork of the fronthaul network.

At the step E1201, each compatible node deletes the broadcast packets comprising at least one item of information identifying a secondary subnetwork, for example at least one item of information identifying a virtual network, on the interfaces of the backhaul subnetwork connected to a switch and/or to an incompatible node.

The broadcast packets comprising at least one item of information identifying a secondary subnetwork are actually in the secondary subnetwork, intended for the secondary subnetwork, and the at least one item of information identifying a secondary subnetwork is for example an encapsulation of the virtual network that makes it possible to isolate the various networks from each other.

At the step E1202, each compatible node transforms the broadcast packets intended for equipment of a secondary subnetwork for which the path from the sender passes through a switch or an incompatible node into unicast packets.

At the step E1203, each compatible node maintains the multicast sending of the broadcast messages comprising information identifying a secondary subnetwork on the primary network interfaces or to the compatible node or nodes.

In a variant, when the local area network comprises at least one incompatible node or a switch, the broadcast messages sent in the secondary subnetworks are transformed into unicast messages at each compatible node.

In a variant, only one or some of the steps described in association with FIG. 12 are performed when the filtering rules are applied.

For example, the node GW transforms all the packets broadcast in multicast into unicast messages intended for the stations PC4, PC5 and PC6 and the bridges BR_GUEST1 and BR_GUEST2.

Thus a packet broadcast on the interface BR_GUESTG is replaced by the sending of four unicast packets. There is then no longer any broadcast (multicast) packet sent over the interface BR_GUESTG.

The transformation of all the packets broadcast into unicast messages intended for the stations PC4, PC5 and PC6 can be implemented at the network interfaces to which the stations PC4, PC5 and PC6 are connected.

It should be noted here that, when the local area network comprises only compatible nodes and no switch, each compatible node deletes the broadcast packets possessing information identifying a secondary subnetwork on the primary interfaces of the backhaul subnetwork.

The invention claimed is:

1. A method for managing messages broadcast in a local area network comprising nodes allowing an extension of wireless communication coverage and stations, the nodes allowing an extension of coverage being connected together by a backhaul subnetwork, at least one node allowing an extension of wireless communication coverage sending at least one wireless network, referred to as fronthaul network, to which the stations are connected, the local area network comprising a primary subnetwork and a secondary subnetwork, the primary subnetwork being a subnetwork to which the links of the backhaul network and the nodes belong, the secondary subnetwork being a subnetwork composed of at least one station and which is isolated from the rest of the local area network by a virtual network, wherein the method comprises the steps, performed by a node able to apply filtering rules, of:

demanding an analysis of the topology of the local area network, determining from the topology of the local area network, filtering rules to be applied, applying the filtering rules determined to the broadcast packets comprising at least one item of information identifying the virtual network, wherein analysing the topology of the network comprises determining the presence of a node unable to apply the filtering rules and/or the presence of a switch connected to the backhaul subnetwork, and wherein applying the filtering rules to be applied is broken down into substeps of:

deleting the broadcast packets comprising information identifying a secondary subnetwork on the interfaces of the primary subnetwork of the fronthaul network, deleting broadcast packets comprising information identifying a secondary subnetwork on the interfaces of the backhaul subnetwork connected to a switch and/or to an unable node, transforming the broadcast packets intended for equipment of a secondary subnetwork for which the path from the sender passes through a switch or an unable node into unicast packets.

2. The method according to claim 1, wherein, if the local area network comprises only nodes able to apply the filtering rules and no switch, each compatible node deletes the broadcast packets possessing information identifying a secondary subnetwork on the primary interfaces of the backhaul subnetwork.

3. The method according to claim 1, wherein applying the filtering rules to be applied is broken down into a substep of:

transforming the broadcast packets sent in the secondary subnetworks into unicast packets at each able node.

4. The method according to claim 1, wherein determining the topology of the network is broken down into substeps of:

generating a table representing the subnetwork to which each interface and each bridge of a node belongs, generating a table representing the list of equipment in the local area network, generating a table representing the type of each item of equipment in the local area network, generating a table for determining the connection interface of each item of equipment in the local area network, generating a table describing, for each interface, whether it belongs to the backhaul subnetwork or to the fronthaul subnetwork, generating a table describing, for each item of equipment, whether it is physically connected to an interface of the fronthaul network, generating a table describing, for each station, whether it is physically connected to an interface of a node.

5. The method according to claim 1, wherein the method is implemented by a node called a residential gateway that provides access to the internet.

6. A device for managing messages broadcast in a local area network comprising nodes allowing an extension of wireless communication coverage and stations, the nodes allowing an extension of coverage being connected together by a backhaul subnetwork, at least one node allowing an extension of wireless communication coverage sending at least one wireless network, referred to as fronthaul network, to which the stations are connected, the local area network comprising a primary subnetwork and a secondary subnetwork, the primary subnetwork being a subnetwork to which the links of the backhaul network and the nodes belong, the secondary subnetwork being a subnetwork composed of at least one station and which is isolated from the rest of the local area network by a virtual network, wherein the device is included in a node able to apply filtering rules and comprises electronic circuitry configured for:

demanding an analysis of the topology of the local area network, determining, from the topology of the local area network, filtering rules to be applied, applying the filtering rules determined to the broadcast packets comprising at least one item of information identifying the virtual network, wherein the analysis of the topology of the network comprises determining the presence of a node unable to apply the filtering rules and/or the presence of a switch connected to the backhaul subnetwork, and wherein applying the filtering rules to be applied is broken down into substeps of:

deleting the broadcast packets comprising information identifying a secondary subnetwork on the interfaces of the primary subnetwork of the fronthaul network, deleting broadcast packets comprising information identifying a secondary subnetwork on the interfaces of the backhaul subnetwork connected to a switch and/or to an unable node, transforming the broadcast packets intended for equipment of a secondary subnetwork for which the path from the sender passes through a switch or an unable node into unicast packets.

7. A non-transitory storage medium storing a computer program product that comprises instructions for implementing, by a node, the method according to claim 1, when said program is executed by a processor of the node.

* * * * *